(12) United States Patent
Nelson et al.

(10) Patent No.: US 7,958,154 B2
(45) Date of Patent: Jun. 7, 2011

(54) APPARATUS, SYSTEM, AND METHOD FOR COMMAND MANAGER SUPPORT FOR PLUGGABLE DATA FORMATS

(75) Inventors: Travis E. Nelson, San Jose, CA (US);
Daniel J. Savoie, Raleigh, NC (US);
Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 11/847,318

(22) Filed: Aug. 29, 2007

(65) Prior Publication Data
US 2009/0063433 A1 Mar. 5, 2009

(51) Int. Cl.
*G06F 7/00* (2006.01)
(52) U.S. Cl. ....................................... 707/793
(58) Field of Classification Search ............ 707/793
See application file for complete search history.

(56) References Cited

U.S. PATENT DOCUMENTS

| | | | |
|---|---|---|---|
| 5,873,075 A | 2/1999 | Cochrane et al. | |
| 6,453,314 B1 | 9/2002 | Chan et al. | |
| 6,499,036 B1 | 12/2002 | Gurevich | 707/103 |
| 6,651,243 B1 | 11/2003 | Berry et al. | |
| 6,654,753 B1 | 11/2003 | Arda et al. | |
| 6,658,428 B2 | 12/2003 | Sokol et al. | |
| 6,665,662 B1 | 12/2003 | Kirkwood et al. | 707/3 |
| 6,711,624 B1 | 3/2004 | Narurkar et al. | 709/321 |
| 6,867,782 B2 | 3/2005 | Gaudette et al. | |
| 6,883,170 B1 | 4/2005 | Garcia | |
| 6,924,821 B2 | 8/2005 | Trinh et al. | |
| 7,111,194 B1 | 9/2006 | Schoenthal et al. | |
| 7,155,440 B1 | 12/2006 | Kronmiller et al. | |
| 7,197,512 B2 | 3/2007 | Pharies et al. | 707/103 |
| 7,412,455 B2 | 8/2008 | Dillon | |
| 7,457,817 B2 | 11/2008 | Krishnaswamy et al. | |

(Continued)

FOREIGN PATENT DOCUMENTS

EP 1117049 7/2001

(Continued)

OTHER PUBLICATIONS

ICS Technical Support Services, "Stored Procedures", ICS Support Oct. 2001, http://web.archive.org/web/20011005162453/http://www.ics.com/support/docs/dx/1.5/stored.html, ICS Support, Oct. 2001.

(Continued)

*Primary Examiner* — Don Wong
*Assistant Examiner* — Michael Le
(74) *Attorney, Agent, or Firm* — Kunzler Needham Massey & Thorpe

(57) ABSTRACT

An apparatus, system, and method for providing command manager support for pluggable data formats. The present invention accepts arbitrary hierarchical input data structures even when the hierarchical input data structure represents hierarchical data in a structure independent of a specific type of data repository. A data mediator receives a hierarchical input data structure and determines whether if it is a snapshot structure or a delta structure. If it is a snapshot update, the command manager creates an in-memory map object structure populated with values from a data repository and compares it with the snapshot. Based on the comparison, it generates a DESPI hierarchical command structure in a format-specific mediation module, and the commands are executed in the data repository. If the hierarchical input data structure is a delta structure, the command manager generates a hierarchical command structure and then translates it to a DESPI-compliant command structure. The commands are then executed in the data repository.

6 Claims, 3 Drawing Sheets

U.S. PATENT DOCUMENTS

| | | |
|---|---|---|
| 7,603,366 B1 | 10/2009 | Gritsay et al. |
| 2002/0147731 A1 | 10/2002 | Seestrom et al. .......... 707/104.1 |
| 2003/0101169 A1 | 5/2003 | Bhatt et al. |
| 2003/0101194 A1 | 5/2003 | Rys et al. |
| 2003/0177114 A1 | 9/2003 | Lin et al. |
| 2003/0195765 A1 | 10/2003 | Sehga et al. ....................... 705/1 |
| 2004/0083222 A1 | 4/2004 | Pecherer |
| 2004/0117513 A1 | 6/2004 | Scott .................................. 710/1 |
| 2004/0199577 A1 | 10/2004 | Burd et al. |
| 2005/0027732 A1 | 2/2005 | Kalima |
| 2005/0080755 A1 | 4/2005 | Aoyama ........................... 707/1 |
| 2005/0091252 A1 | 4/2005 | Liebich et al. |
| 2005/0131964 A1 | 6/2005 | Saxena |
| 2005/0171966 A1 | 8/2005 | Rath et al. ..................... 707/101 |
| 2005/0246435 A1 | 11/2005 | Choudhary et al. .......... 709/223 |
| 2006/0056301 A1 | 3/2006 | Soncodi |
| 2006/0059496 A1 | 3/2006 | Joy et al. |
| 2006/0095288 A1 | 5/2006 | Amys et al. ........................ 705/1 |
| 2006/0259909 A1 | 11/2006 | Passero et al. ................. 719/312 |
| 2006/0282439 A1 | 12/2006 | Allen et al. .................... 707/100 |
| 2007/0016915 A1 | 1/2007 | Mukundan et al. ............ 719/330 |

FOREIGN PATENT DOCUMENTS

WO     WO9915979     4/1999

OTHER PUBLICATIONS

Welcome to the IBM WebSphere® Host Access Trandformation Services (HATS) V6 Information Center, http://publib.boulder.ibm.com/infocenter/hatshelp/v60/index.jsp?topic=/com.ibm.hats.doc/common_swg/welcome_template/websphere/WebSphereHats.htm—maybe Apr. 2007?

Using the HATS Bidirectional API, http://publib.boulder.ibm.com/infocenter/hatshelp/v60/topic/com.ibm.hat.

Adapter Pattern, from Wikipedia, the free encyclopedia, http://en.wikipedia.org/wiki/Adapter_pattern.

APPARATUS, SYSTEM, AND METHOD FOR COMMAND MANAGER SUPPORT FOR PLUGGABLE DATA FORMATS

CROSS-REFERENCE TO RELATED APPLICATIONS

The commonly assigned patent application, entitled "APPARATUS, SYSTEM, AND METHOD FOR PROCESSING HIERARCHICAL DATA IN DISPARATE DATA REPOSITORIES", filed on Jun. 10, 2005 by Allen et al., U.S. application Ser. No. 11/150,642, is related to this application and is incorporated by reference herein. This related patent application is hereinafter referred to as the "Command Manager Disclosure".

BACKGROUND OF THE INVENTION

1. Field of the Invention

This invention relates to adding support for pluggable data formats into an apparatus, system, and method for processing hierarchical data in disparate data repositories.

2. Description of the Related Art

Formats and methods for data representation and exchange are numerous. The volume of different sorts of data, represented in different ways, presents significant challenges to a programmer trying to facilitate communication across types. With various data repositories such as databases, web servers, XML data stores, enterprise information systems, and numerous data formats such as XML, SDO, JavaBeans, etc., coordinating communication can be a formidable task.

A typical situation in which such problems occur is where a client wishes to modify data in an Enterprise Information System (EIS) or other data storage mechanism. The client, however, may not know the EIS Application Programming Interface (API), nor the physical structure of the data.

In order to simplify this process, an intermediary agent such as an adaptor or mediator may be used to bridge the gap between the client and the data repository. This agent facilitates the communication between the two entities.

The Command Manager Disclosure, referenced above, discloses a solution to this problem. The Command Manager Disclosure discloses a common data model that is hierarchical. In addition, the Command Manager Disclosure provides support for both 'snapshots' (which represents how the data should look in the EIS) and 'deltas' (which represent the changes that are to be made to the data in the EIS). The Disclosure improves on the prior art by providing common code that is much simpler and more readable than the previous approach which required a large piece of EIS-specific code that could not be re-used.

The Command Manager Disclosure taught a Command Manager used to create commands based on the hierarchical structure. The Command Manager generates appropriate commands using the data hierarchy and a specified action. The disclosure teaches an embodiment where the data mediator, of which the Command Manager is part, receives an incoming data structure and retrieves an existing data structure in the data repository for comparison. The incoming data structure is then compared to the existing data structure. This comprises placing an update command in the command structure for the top level command, extracting a set of child keys for the incoming and existing data structures, identifying each child by key, and determining which children need to be deleted, created, and updated. After the comparison, the command structure is populated with the appropriate commands and the command structure is processed by an interpreter.

There are, however, certain performance costs to the above implementation. For example, in order to perform the comparison, in one embodiment the retrieve operation comprises making a shallow copy of the input structure using Service Data Object (SDO) APIs and then retrieving the data into that structure. However, SDO objects are substantial, and the creation of SDO objects for purpose of comparison imposes a significant burden on the system. In addition, the implementation taught in the Command Manager Disclosure does not support the Data Exchange Systems Programming Interface (DESPI).

The DESPI is a data interface which uses cursors to iterate over repeating data objects within a runtime's data set, and uses accessors to access the individual elements within an object. The cursors and accessors point to the native data of the runtime; thus, if the runtime uses XML, cursors and accessors reference elements and attributes respectively. As a result, a connector component (which encapsulates the basic connectivity to a data repository) does not need to be aware of the underlying data structure being referenced since the cursor and accessors hide these additional details. By using the DESPI, a wide variety of data formats can be supported without requiring a transformation of an incoming data structure of arbitrary format into a canonical data format.

SUMMARY OF THE INVENTION

Applicants submit that there exists a need for command manager support for pluggable data formats such that the services provided by the command manager as described in the Command Manager Disclosure are provided for a wide variety of data formats without requiring an additional transformation of an incoming hierarchical input data structure into a canonical data format. Ideally, the invention should provide performance benefits over the approach taught in the Command Manager Disclosure and implement the DESPI interface.

The present invention has been developed in response to the present state of the art, and in particular, in response to the problems and needs in the art that have not yet been fully solved. Accordingly, the present invention has been developed to provide a computer program product and system for providing command manager support for pluggable data formats, the operations of the computer program product comprising receiving a hierarchical input data structure from a client, where the hierarchical input data structure represents hierarchical data in a structure independent of a specific type of data repository. The operations further comprise determining that the hierarchical input data structure comprises one of a snapshot structure and delta structure.

If the hierarchical input data structure is a snapshot structure, the operations further comprise creating a map object structure and copying one or more keys of the hierarchical input data structure into the map object structure and retrieving data values for each field of the map object structure from a hierarchical repository data structure in a data repository. The operations then comprise comparing the hierarchical input data structure with the map object structure using a cursor Application Programming Interface (API) and accessor API and creating in an adaptor a DESPI hierarchical command structure of repository-specific commands. The DESPI hierarchical command structure also comprises one or more node locations positions. When the DESPI hierarchical command structure is executed, the repository-specific commands are executed and update the hierarchical repository data structure such that the hierarchical repository data structure is identical to the hierarchical input data structure.

If the hierarchical input data structure is a delta structure, the operations of the computer program product further comprise determining that the delta structure is a Service Data Object (SDO) comprising a change summary, and creating a hierarchical command structure comprising repository-specific commands derived from the change summary of the delta structure in accordance with the Command Manager Disclosure. The operations also comprise creating in the adaptor a DESPI hierarchical command structure from the hierarchical command structure, where creating a DESPI hierarchical command structure further comprises starting at a top node of the hierarchical command structure and creating for each node of the hierarchical command structure a node of the DESPI hierarchical command structure, copying command attributes of the hierarchical command structure to the DESPI hierarchical command structure, and providing cursor positions for the DESPI hierarchical command structure. The operations further comprise executing the DESPI hierarchical command structure such that the individual repository-specific commands are executed in the data repository.

In one embodiment, retrieving data values for each field of the map object structure from the data repository further comprises the Command Manager invoking the format-specific mediation module's StructuredRecord Implementation to retrieve the data from the data repository. The map object structure may be implemented using a Hash Map.

In one embodiment, retrieving data values for each field of the map object structure from the data repository further comprises the map object structure storing key field values from the data repository and not non-key field values.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
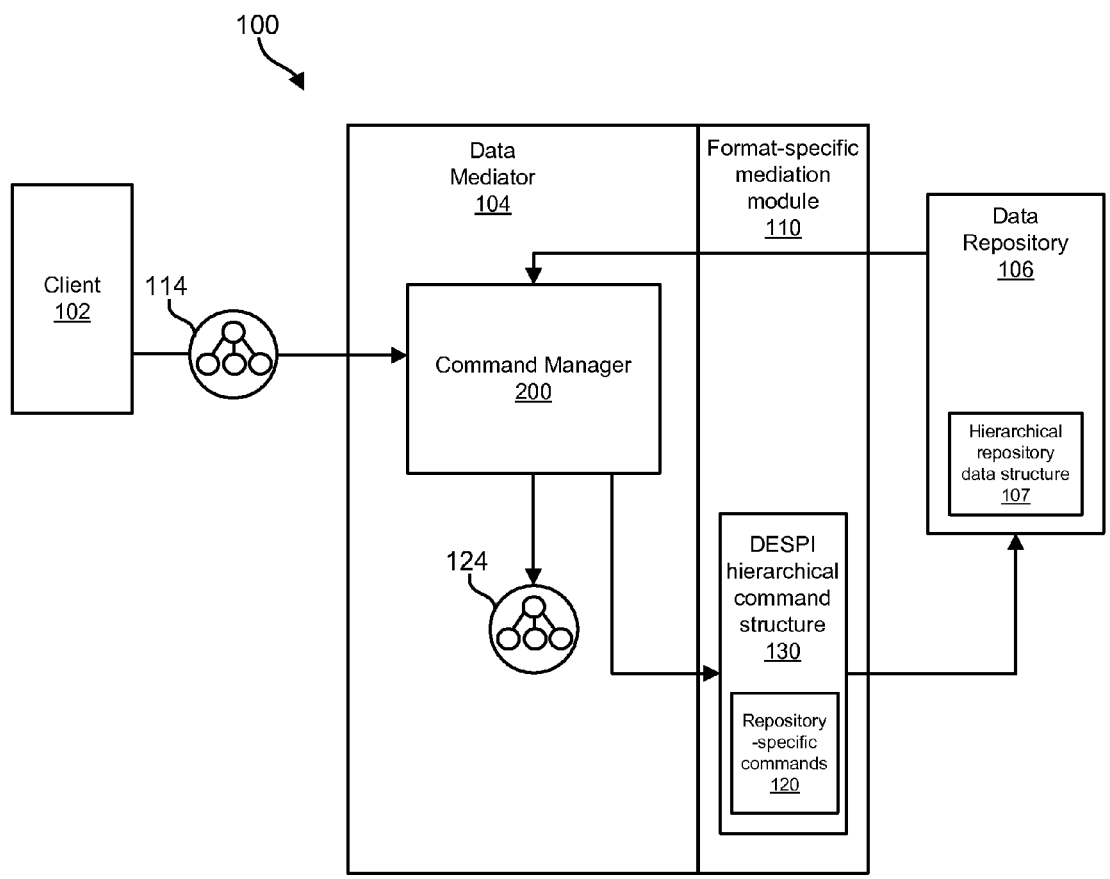
FIG. 1 is a schematic block diagram illustrating one embodiment of a system for handling a hierarchical input data structure comprising a snapshot structure.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices. The storage devices may comprise any suitable non-transient computer useable medium suitable for storing data and instructions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram illustrating one embodiment of a system 100 for handling a hierarchical input data structure comprising a snapshot structure. The system 100 comprises a client 102, a hierarchical input data structure 114, data mediator 104, format-specific mediation module 110, and a data repository 106. The client 102 may be a user, a program, or other entity with the need to access and add, remove, or change data in the data repository 106. The data repository 106 comprises an appropriate source of one or more hierarchical repository data structures 107. In one embodiment, the data repository 106 is an Enterprise Information System (EIS). Typical embodiments of the data repository include database management systems (DBMS), Storage Area Networks (SAN), and other data storage systems along with their corresponding components, as known to those of skill in the art.

The hierarchical input data structure 114 comprises data stored in a hierarchical form. The data of the hierarchical input data structure 114 is represented in a structure independent of a specific type of data repository 106. For example, the hierarchical input data structure 114 may comprise a JavaBean, a Service Data Object (SDO), XML, or other hierarchical data representations known to those in the art. Where the hierarchical input data structure 114 is an edit to data in the data repository 106, the hierarchical input data structure 114 has a related hierarchical repository data structure 107. For example, a hierarchical input data structure 114 may comprise information related to a company with two employees and the employee home addresses. In such an embodiment, the company and data fields related to the company (name, location, etc) constitutes the parent node, with the employees and the respective fields the children, each employee additionally having a home address constituting a child node of the employee.

The hierarchical input data structure 114 may comprise a snapshot structure or a delta structure. A snapshot structure is a structure that reflects the way the related hierarchical repository data structure 107 should look. For example, the snapshot may have a company with a location field with the string value "New York." In contrast, the related hierarchical repository data structure 107 may have the same company with a location field value of "Boston." As such, the value "Boston" should be changed to reflect the value "New York" after processing of the snapshot structure is complete. In contrast, a delta structure contains information reflecting desired changes to the hierarchical repository data structure 107. For example, the delta structure may simply specify that the location field value of a hierarchical repository data structure 107 should be changed to the string value "New York."

The system further comprises a data mediator 104. The data mediator 104 provides the necessary communications to allow a client 102 providing a hierarchical input data structure 114 of any number of possible hierarchical formats, such as JavaBean, XML, or SDO, to communicate with the data repository 106 and appropriately make changes to the corresponding hierarchical repository data structure 107. The data mediator 104 further comprises a command manager 200 and a format-specific mediation module 110.

The command manager 200 is configured to provide the necessary functions and operations to determine an appropriate action to take in the data repository 106 based on the hierarchical input data structure 114. After determining the appropriate actions to take, the command manager 200 creates a DESPI hierarchical command structure 130 that comprises repository specific commands 120 in the format-specific mediation module 110. The DESPI hierarchical command structure 130 is implemented using cursors and accessors such that the DESPI hierarchical command structure 130 is DESPI compliant. The command manager 200 then executes the repository specific commands 120 and the appropriate commands are executed in the data repository 106.

Depicted in FIG. 1 is the operation of the system in response to a hierarchical input data structure 114 comprising a snapshot structure. The data mediator 104 receives the hierarchical input data structure 114, and the command manager 200 determines that the hierarchical input data structure 114 is a snapshot structure. In response, the command manager 200 creates a map object structure 124. The map object structure 124 is a light-weight intermediate data format that complies with the DESPI used by the format-specific mediation module 110. The map object structure 124 is also an in-memory representation. The command manager 200 copies one or more keys of the hierarchical input data structure 114 into the map object structure 124. The command manager 200 then retrieves data values from the related hierarchical repository data structure 107 in the data repository 106 into each field of the map object structure 124. The command manager 200 performs the retrieval of data from the data repository 106 using the StructuredRecord Implementation of the format-specific mediation module 110.

In one embodiment, the map object structure 124 is created by using the DataExchangeFactory interface of the format-specific mediation module 110. The DataExchangeFactory provides the entry points for creating Cursors and Accessors to the data, which in turn reference the native data of the runtime. Thus, if the runtime uses XML, the cursors references elements and the accessors attributes of a DOM representation. The cursors and accessors thus hide the implementation-specific details.

In one embodiment, the command manager 200 may store only the keys of the hierarchical repository data structure 107. This offers a significant benefit over implementations which perform a full retrieve of the data in the hierarchical repository data structure 107 as it reduces the processing and storage overhead associated with retrieving and storing the data. In addition, the map object structure 124 may be implemented using a Hash Map. The use and purpose of hash maps and tables are well-known to those of skill in the art. By using a hashing algorithm on the keys, the map object structure 124 provides faster access and operations than other implementation methods.

With the map object structure 124 built, the command manager 200 compares the map object structure 124 with the hierarchical input data structure 114 which, as stated above, is a snapshot structure. With the DESPI implementation in place, the command manager 200 compares the hierarchical input data structure 114 with the map object structure 124 using a cursor API and accessor API. Based on this comparison, the command manager 200 can determine which commands are necessary in order to replicate the information in the hierarchical input data structure 114 snapshot update in the hierarchical repository data structure 107 in the data repository 106. The comparison process is described in greater detail in the Command Manager Disclosure referenced above.

Based on the comparison, the command manager 200 creates in the format-specific mediation module 110 a DESPI hierarchical command structure 130. The DESPI hierarchical command structure 130 comprises repository-specific commands 120 which are configured to update the hierarchical repository data structure 107 such that the hierarchical repository data structure 107 reflects the changes evident from the hierarchical input data structure 114 snapshot update. The process of creating a hierarchical command structure is detailed in the Command Manager Disclosure; however, the present application further incorporates the insertion of one or more node location positions into the DESPI hierarchical command structure 130. In one embodiment, the node location positions are the index of the cursor. By incorporating cursor information into the DESPI hierarchical command structure 130, the DESPI hierarchical command structure 130 can be handled and executed consistent with the DESPI interface.

Once the command manager 200 creates the DESPI hierarchical command structure 130 in the format-specific mediation module 110, the interpreter (not shown) 'walks' the DESPI hierarchical command structure 130 structure and executes all commands in the data repository 106. The details of this process are described in the Command Manager Disclosure. Upon completion, the data repository 106 will reflect the changes found from the comparison of the hierarchical input data structure 114 snapshot update with the map object structure 124.

Figure 2:
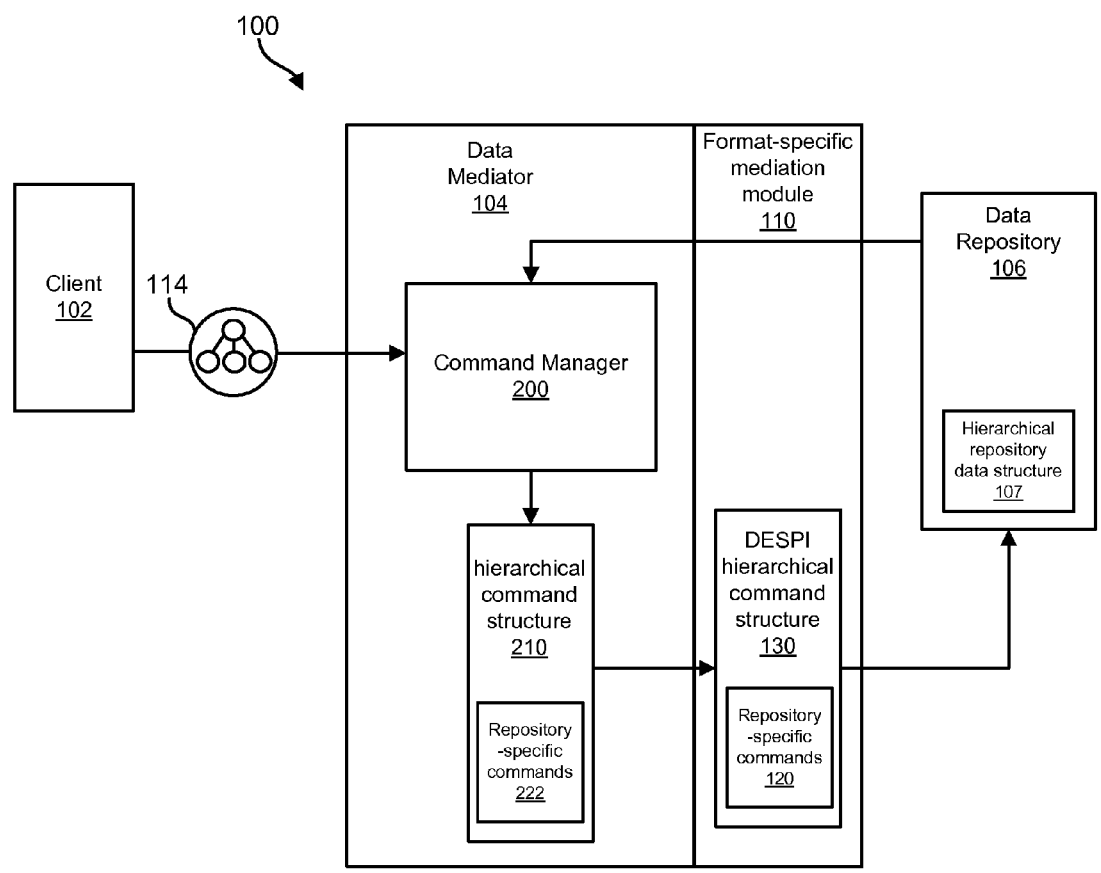
FIG. 2 is a schematic block diagram illustrating one embodiment of a system for handling a hierarchical input data structure comprising a delta structure.

FIG. 2 is a schematic block diagram illustrating one embodiment of a system for handling a hierarchical input data structure comprising a delta structure. As described above, where the hierarchical input data structure 114 is a delta structure, the hierarchical input data structure 114 contains information relating desired changes to the hierarchical repository data structure 107. For example, while a snapshot update may be an object with company, employee, and address information that is different from the related hierarchical repository data structure 107, a delta structure may simply specify that a change is needed to the address of a particular employee.

In one embodiment of the invention taught in the Command Manager Disclosure, SDOs are the canonical data form. In such an embodiment, the hierarchical input data structure 114 delta structures are SDOs comprising a change summary. When the hierarchical input data structure 114 is processed, the hierarchical command structure 210 (comprising repository-specific commands 222) is similarly an SDO-based implementation. The details of the creation and execution of the hierarchical command structure 210 in response to a delta structure are found in the Command Manager Disclosure.

However, in order to allow a uniform implementation of the present improvements, the delta processing described in the Command Manager Disclosure is altered to provide a DESPI implementation of the hierarchical command structure 210. In the system 100, wherein the hierarchical input data structure 114 is a delta structure, the command manager 200 determines that the hierarchical input data structure 114 delta structure is an SDO comprising a change summary.

As taught in the Command Manager Disclosure, the command manager 200 generates a hierarchical command structure 210 which comprises repository-specific commands 222. The hierarchical command structure 210 is then translated into a DESPI hierarchical command structure 130 by the command manager 200. The command manager 200 starts at the top node of the hierarchical command structure 210 and creates for each node in the hierarchical command structure 210 a corresponding node of the DESPI hierarchical command structure 130. The command attributes of the hierarchical command structure 210 (such as no-op, create, delete, etc) are further copied to the DESPI hierarchical command structure 130. In addition, the command manager 200 provides cursor positions for the DESPI hierarchical command structure 130.

When the DESPI hierarchical command structure 130 is completed in the format-specific mediation module 110, the resulting DESPI hierarchical command structure 130 is executed by the Interpreter in the same fashion as for the snapshot update. Again, execution of the repository specific commands 120 updates the data repository 106 to reflect the changes as summarized in the hierarchical input data structure 114 delta structure.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
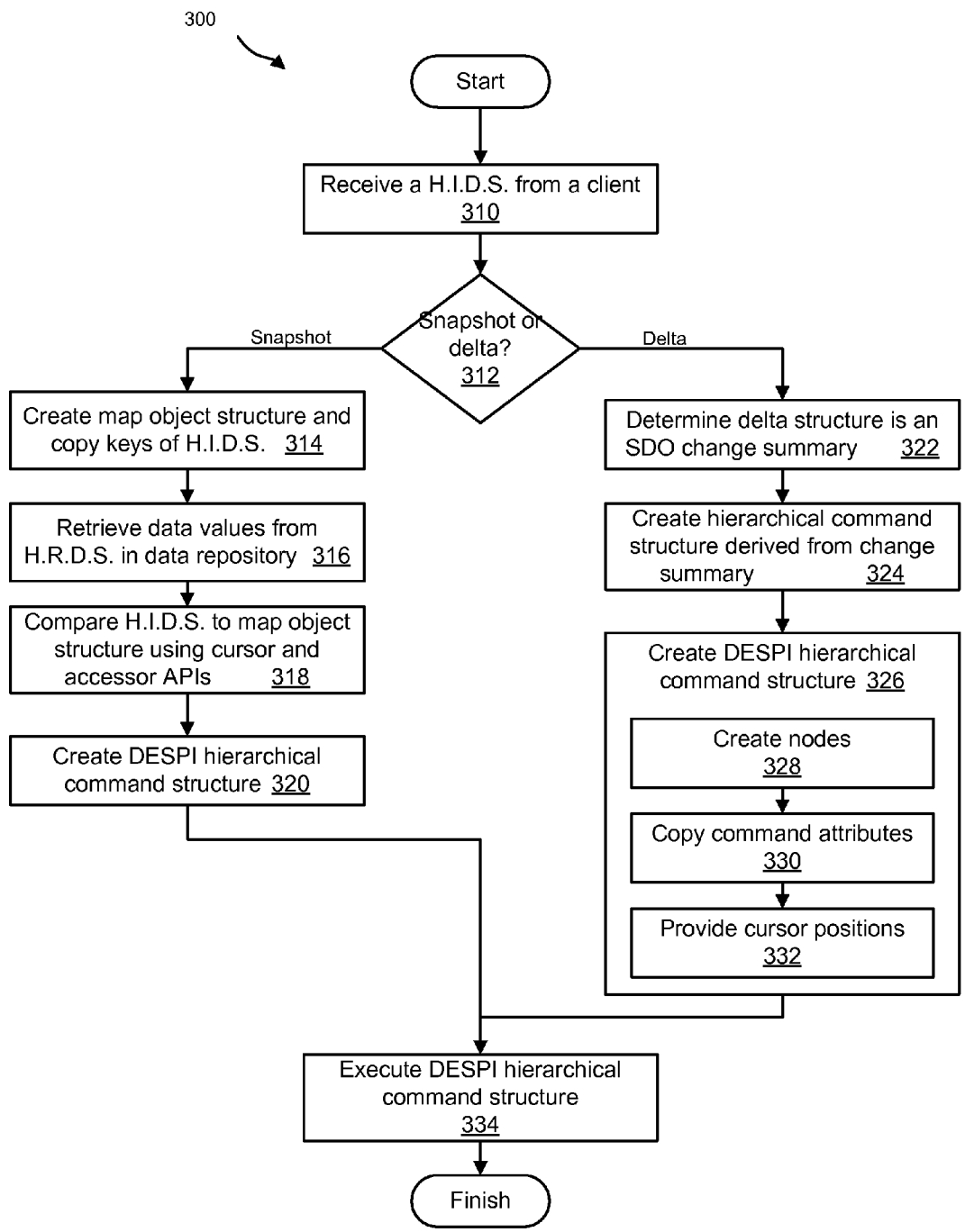
FIG. 3 is a schematic flow chart diagram illustrating one embodiment of a method for processing a hierarchical input data structure.

FIG. 3 is a schematic flow chart diagram illustrating one embodiment of a method for processing a hierarchical input data structure. The method 300 starts when the data mediator 104 receives 310 a hierarchical input data structure 114 (H.I.D.S) from a client 102. The command manager 200 determines 312 whether the hierarchical input data structure 114 is a snapshot structure or a delta structure. If the hierarchical input data structure 114 is a snapshot structure, the command manager 200 creates 314 a map object structure 124 and copies the keys of the hierarchical input data structure 114 snapshot structure into the map object structure 124. The command manager 200 additionally retrieves 316 data values from a hierarchical repository data structure 107 (H.R.D.S) in the data repository 106 into the map object structure 124.

The command manager 200 then compares 318 the hierarchical input data structure 114 snapshot structure with the map object structure 124 using cursor and accessor APIs. Based on this comparison, the command manager 200 creates in the format-specific mediation module 110 a DESPI hierarchical command structure 130 incorporating cursor positions. The interpreter then executes 334 the DESPI hierarchical command structure 130, traversing the DESPI hierarchical command structure 130 and executing the commands in the data repository 106 in the appropriate sequence.

Where the command manager 200 determines 312 that the hierarchical input data structure 114 is a delta structure, the command manager 200 further determines 322 that the hierarchical input data structure 114 delta structure is an SDO object comprising a change summary. The command manager creates 324 a hierarchical command structure 210 derived from the change summary as taught in the Command Manager Disclosure.

Once the hierarchical command structure 210 is created, the command manager 200 creates 326 a DESPI hierarchical command structure 130. This further comprises creating nodes 328 of the DESPI hierarchical command structure 130 by starting at the top node of the hierarchical command structure 210 and creating for each node a corresponding node of the DESPI hierarchical command structure 130. Once the nodes are created, the command manager 200 copies 330 the command attributes from the hierarchical command structure 210 to the DESPI hierarchical command structure 130. The command manager 200 further provides 332 cursor positions for the DESPI hierarchical command structure 130 such that the resulting structure is DESPI-compliant.

With the DESPI hierarchical command structure 130 complete, the interpreter then executes 334 the DESPI hierarchical command structure 130, traversing the DESPI hierarchical command structure 130 and executing the commands in the data repository 106 in the appropriate sequence.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transient computer useable medium having a computer readable program for providing command manager support for pluggable data formats, the operations of the computer program product comprising:

receiving a hierarchical input data structure from a client, the hierarchical input data structure representing hierarchical data in a structure independent of a specific type of data repository;

determining that the hierarchical input data structure comprises one of a snapshot structure and delta structure;

in response to the hierarchical input data structure comprising a snapshot structure, the operations of the computer program product further comprising:

creating a map object structure and copying one or more keys of the hierarchical input data structure into the map object structure;

retrieving data values for each field of the map object structure from a hierarchical repository data structure in a data repository;

comparing the hierarchical input data structure with the map object structure using a cursor Application Programming Interface (API) and accessor API;

creating in an adaptor a data exchange systems programming interface (DESPI) hierarchical command structure comprising repository-specific commands and further comprising one or more node locations positions, the repository-specific commands configured to update a hierarchical repository data structure such that the hierarchical repository data structure is identical to the hierarchical input data structure;

executing the DESPI hierarchical command structure such that the individual repository-specific commands are executed in the data repository.

2. The computer program product of claim 1, wherein the hierarchical input data structure comprises a delta structure, the operations of the computer program product further comprising:

determining that the delta structure is a Service Data Object (SDO) comprising a change summary;

creating a hierarchical command structure comprising repository-specific commands derived from the change summary of the delta structure;

creating in the adaptor a DESPI hierarchical command structure from the hierarchical command structure, creating a DESPI hierarchical command structure further comprising:

starting at a top node of the hierarchical command structure and creating for each node of the hierarchical command structure a node of the DESPI hierarchical command structure;

copying command attributes of the hierarchical command structure to the DESPI hierarchical command structure;

providing cursor positions for the DESPI hierarchical command structure;

executing the DESPI hierarchical command structure such that the individual repository-specific commands are executed in the data repository.

3. The computer program product of claim 1, wherein retrieving data values for each field of the map object structure from a data repository further comprises a command manager invoking the format-specific mediation module's StructuredRecord Implementation to retrieve the data from the data repository.

4. The computer program product of claim 1, wherein retrieving data values for each field of the map object structure from the data repository further comprises the map object structure storing key field values from the data repository and not non-key field values.

5. The computer program product of claim 1, wherein the map object structure is implemented using a hash map.

6. A system for providing command manager support for pluggable data formats, the system comprising a processor and memory, and further comprising:

a command manager configured to:

receive a hierarchical input data structure from a client, the hierarchical input data structure representing hierarchical data in a structure independent of a specific type of data repository;

determine that the hierarchical input data structure comprises one of a snapshot structure and delta structure;

in response to the hierarchical input data structure comprising a snapshot structure:

create a map object structure and copy one or more keys of the hierarchical input data structure into the map object structure;

retrieve data values for each field of the map object structure from a hierarchical repository data structure in a data repository by invoking an format-specific mediation module's StructuredRecord Implementation;

compare the hierarchical input data structure with the map object structure using a cursor Application Programming Interface (API) and accessor API;

create in an adaptor a data exchange systems programming interface (DESPI) hierarchical command structure comprising repository-specific commands and further comprising one or more node locations positions, the repository-specific commands configured to update a hierarchical repository data structure such that the hierarchical repository data structure is identical to the hierarchical input data structure; and executing the DESPI hierarchical command structure such that the individual repository-specific commands are executed in the data repository;

a DataExchangeFactory configured to create map object structures;

the format-specific mediation module comprising the StructuredRecord Implementation;

a data repository comprising one or more hierarchical repository data structures.

\* \* \* \* \*